United States Patent

[11] 3,589,122

| | | |
|---|---|---|
| [72] | Inventor | Albrecht Haag<br>Neckar, Germany |
| [21] | Appl. No | 808,160 |
| [22] | Filed | Mar. 18, 1969 |
| [45] | Patented | June 29, 1971 |
| [73] | Assignee | Kienzle Uhrenfabriken G.m.b.H.<br>Schwenningen a.N., Germany |
| [32] | Priority | Mar. 20, 1968 |
| [33] | | Germany |
| [31] | | P 17 73 005.1 |

[54] ELECTRODYNAMIC OSCILLATOR
6 Claims, 4 Drawing Figs.

[52] U.S. Cl. ................................................. 58/28,
318/127
[51] Int. Cl. ....................................................... G04c 3/04
[50] Field of Search............................................ 58/23, 28,
28 A, 28 B, 107; 318/127-32

[56] References Cited
UNITED STATES PATENTS
3,327,190 6/1967 Reich ........................... 318/128

Primary Examiner—Richard B. Wilkinson
Assistant Examiner—Edith C. Simmons
Attorney—Franklin R. Jenkins ABSTRACT: An electrically driven oscillator for timepieces wherein at null position a turnable oscillatory barlike magnet sweeps transversely edges of two tilted coils to give cumulative control potentials, the sign of the potentials being in accordance with the direction of swing, while at about 90° from null at least pole of the magnet sweeps adjacent other portions of the coils producing opposing potentials. Potentials control drive impulses through a transistor.

PATENTED JUN 29 1971

3,589,122

INVENTOR:
ALBRECHT HAAG
By
F.K. Jenkins
Agent 3,589,122

ELECTRODYNAMIC OSCILLATOR

BACKGROUND OF THE INVENTION

1. Field of the Invention

Two coil pickups for transistor circuit for mechanical oscillator.

2. Description of the Prior Art

In the art of electrodynamic driven balances for clocks, it is conventional to use a fixed control coil made up of two control coils which are inclined at about 120° to each other. This control coil system cooperates with a permanent magnet on the balance wheel, or the magnet is itself the balance, the magnet being composed of two poles of the same polarity and one pole of opposite polarity. This coils-and-magnet arrangement produces control impulses at the null position of the oscillator, while the induced voltages during an oscillator amplitude of 120° exhibit counterpolarities and so cancel each other. Therefore only one impulse occurs in the null position.

Additionally there is an arrangement wherein two coils are situated near each other and those two coils are both influenced when the magnet pole on the balance goes through null position. In this arrangement it is possible that upon a half-swing of the balance, one impulse occurs in null position and during the other half-swing, two impulses occur symmetric to null.

This last named arrangement has the drawback that the oscillatory system must be constructed unsymmetrically, and when it comes to balancing out the weight of the permanent magnet on the balance wheel, it is necessary that balancing-out weights must be applied to the other portions of the oscillator.

SUMMARY OF THE INVENTION

The present invention overcomes the above objections and provides an oscillator especially useful at relatively high frequencies as a balance or balance wheel whose amplitude is less than 180°. Moreover the oscillating parts are mechanically symmetrical. Then too, only one control impulse for yielding a drive impulse occurs for each full swing. The oscillator has two tilted adjacent control coils connected in series so arranged with respect to a turning magnet member that the poles transversely sweep turns of both coils going through null to give cumulative potentials and at about 90° from null the potentials are in opposition.

DESCRIPTION OF THE PREFERRED EMBODIMENTS

Figure 1:
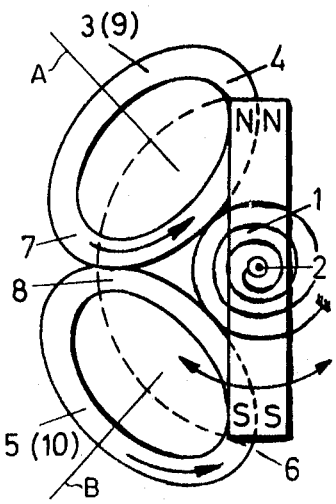
FIG. 1 is a plan of the invention.

FIG. 1 shows an oscillator made up of a bar magnet 1 mounted to oscillate on a pivot pin 2. Coils generally designated 3 and 5 are control or pickup coils and shaped or their central axes A and B are inclined or tilted with respect to each other and to the axis of the pin 2 so that magnet end poles may sweep near and transversely across the turns of the coils at zones 4 and 7 in coil 3 and zones 8 and 6 in coil 4. The zones 7 and 8 in separate coils are substantially adjacent to each other. Since all these zones are transversely swept by the flux they are called active zones In its simplest form of deve    .nent the oscillator is comprised of a permanent bar magnet whose ends are respectively north and south. Instead of one bar magnet, an astatic magnetic arrangement may be used made up of two bars so that at the ends of one oscillator half, the magnetic flux flows from a north pole of one bar to the south pole of the other bar and in this way needs no magnetic return path over the pivot pin 2, for the two fluxes at the ends are of opposite sign.

The composite bar is polarized in a direction parallel with its turning axis. The bar shown may be made up of two magnets similarly polarized.

On one side of the balance in rest position the two control coils 3 and 5 are arranged so that upon the balance going through null the magnetic poles traverse and influence the active coil zones 4 and 6. The two other active zones 7 and 8 oppose each other and come under the influence of one of the magnet poles during a swing deflection of some 90° from the position shown in FIG. 1.

It is advantageous if the width of the active coil zones corresponds to half the width of the magnet poles. In this case, upon a 90° amplitude of swing, the coil zones 7 and 8 are simultaneously swept by one of the magnet poles.

Figure 4:
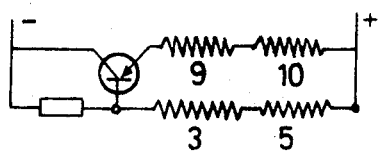
FIG. 4 shows the circuitry of the invention.

Both coils exhibit the same sense of current flow. If both have the same direction of winding, then the inner end of one is connected to the outer end of the other. If counterdirectional winding is provided for both coils 3 and 5, then the two inner ends or the two outer ends are already connected to each other. The two coils 3 and 5 lie serially in the base-emitter circuit of a transistor-controlled switching circuit as shown in FIG. 4.

Figure 2:
FIG. 2 shows a theoretical relationship between inducted potentials and time as occuring in null positions and at some 90° therefrom.

During passage through null, voltages induced in the coils 3 and 5 through the effects in the active zones 4 and 6, are additive as shown in FIG. 2. That is to say, in the null range, for instance, at the beginning of the period T a swing of the north pole past zone 4 and of the south pole past zone 6 in one direction gives additive negative voltages. Upon a deflection of 90° by the oscillator the active coil zones 7 and 8 are modulated by one of the magnet poles so that the corresponding induced potentials in coil 3 and coil 5 respectively are counterdirectional, both as the north pole sweep zones 7 and 8 in one direction to maximum turning amplitude and then on the reverse motion.

Both induced voltages offset each other so that no control potential may modulate the transistor. The resulting induced potentials in coils 3 and 5, during a swing of some 90°, are as derived from FIG. 1. In the one half-swing, the resulting induced potentials in coils 3 and 5 by sweeping zones 4 and 6 are negative while the balance wheel passes through null position and in the other half-swing they are positive. In this way only one control impulse per full swing occurs to trigger a current flow in the emitter-collector circuit of the transistor.

The drive coils 9 and 10 in the emitter-collector circuit of the transistor are preferably wound together with the control coils 3 and 5 and are congruent therewith.

Figure 3:
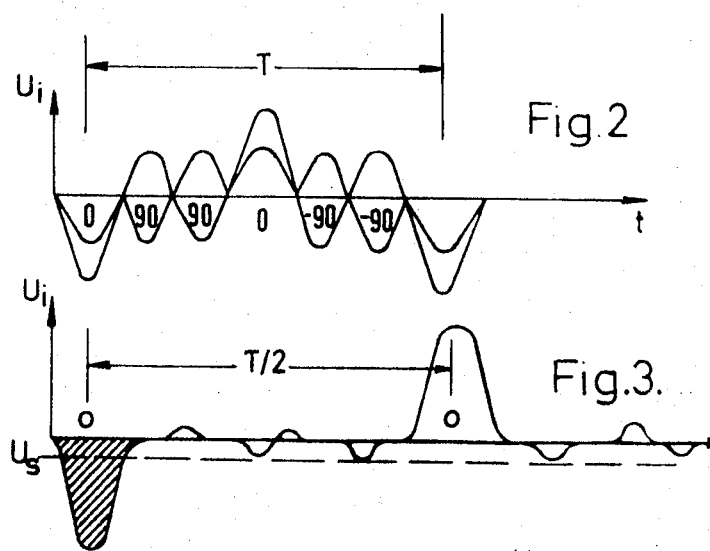
FIG. 3 shows the actual relationship between potentials and time.

Because of a certain amount of asymmetry in the construction of the coils and magnet system, shortly after the passage through null and both before and after a turning to 90°, small detectable impulses occur as shown in FIG. 3. Thus, with the bar turning counterclockwise, after going through null to produce a cumulative negative impulse below the threshold voltage $U_s$ to activate the transistor, the north pole sweeps toward zone 7 and shows a slight positive net voltage induced in coil 3 as shown as the first positive impulse in FIG. 3. When the north pole progresses so as to approach zone 8 a small negative impulse occurs and when the pole now swings backward, or clockwise, a small positive impulse follows, which is in turn, followed by a small negative impulse by action at zone 7. As the bar goes through null counterclockwise in position of FIG. 1, north and south poles act on zones 4 and 6 with cumulative potentials to give a highly positive impulse.

The small negative impulses are each too small to afford any substantial conductance to the transistor. By using a silicon transistor, the threshold voltages will be so high that these small impulses will not cause any action of the transistor. That portion of the first impulse that falls below the preset voltage $U_s$ biases the transistor to the conductive state for a drive impulse to develop in the drive coils 9 and 10.

FIG. 4 shows circuitry for the transistor 11 with the control coils 3 and 5 in the base-emitter circuit and the drive coils in the emitter-collector circuit. A resistor from collector to base serves for setting the polarizing potential $U_r$.

I claim:

1. In an electrodynamic balance system for timepieces driven through a transistor controlled drive means and having a magnet pole on a balance cooperating with fixed coils as pickup coils, the improvement, wherein the two substantially like shaped pickup coils are axially tilted with respect to each other and to the axis of the balance, a magnet member on the balance turnable to sweep through a plane to which the balance axis is perpendicular, the magnet member having opposite sign poles in diametric direction relative to the balance axis, the coils presenting active zones substantially at the paths of sweep of the respective poles so that one pole moves transversely to the winding of the one coil while the other pole moves transversely to the windings of the other coil in the opposite direction as the balance passes through null, the coils being near each other and having active other zones side by side about 90° from null position, the windings of the coils being so connected that a voltage is induced by passage of the poles during turning of the balance while the latter goes through null, and when a pole sweeps the side-by-side active zones induced voltages are of opposite sign.

2. In a system as claimed in claim 1, the two coils being connected to give voltages of the same sign when the two poles go through a null position.

3. In a system as claimed in claim 1, the magnet member being polarized in a direction parallel to the balance axis.

4. In a system as claimed in claim 1, at least one of the pickup coils having a drive coil of similar form associated therewith.

5. In a system as claimed in claim 1, the threshold value of the input circuit of the transistor being higher than the net induced voltages in the active side-by-side zones of the coils due to these zones now being coincident when the magnet member is deflected on the order of 90° from null position.

6. In a system as claimed in claim 1, the width of each active zone in the coils being about half the width of the poles.